(12) United States Patent
Dong et al.

(10) Patent No.: US 9,869,902 B2
(45) Date of Patent: Jan. 16, 2018

(54) ARRAY SUBSTRATE AND METHOD OF MANUFACTURING THE SAME, AND DISPLAY DEVICE

(71) Applicants: BOE Technology Group Co., Ltd., Beijing (CN); Beijing BOE Optoelectronics Technology Co., Ltd., Beijing (CN)

(72) Inventors: Tingze Dong, Beijing (CN); Yujia Wang, Beijing (CN); Jun Mo, Beijing (CN); Peiqiang Guan, Beijing (CN); Zhinan Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 30 days.

(21) Appl. No.: 14/778,763

(22) PCT Filed: May 21, 2015

(86) PCT No.: PCT/CN2015/079442
§ 371 (c)(1),
(2) Date: Sep. 21, 2015

(87) PCT Pub. No.: WO2016/045395
PCT Pub. Date: Mar. 31, 2016

(65) Prior Publication Data
US 2016/0306235 A1    Oct. 20, 2016

(30) Foreign Application Priority Data

Sep. 26, 2014 (CN) .......................... 2014 1 0505653

(51) Int. Cl.
*G02F 1/1337* (2006.01)
*G02F 1/1333* (2006.01)
(Continued)

(52) U.S. Cl.
CPC .. *G02F 1/133784* (2013.01); *G02F 1/133345* (2013.01); *G02F 1/133514* (2013.01);
(Continued)

(58) Field of Classification Search
None
See application file for complete search history.

(56) References Cited

U.S. PATENT DOCUMENTS 5,886,761 A * 3/1999 Sasaki ................. H01L 21/0274
257/E21.027
6,985,199 B2    1/2006 Takachi
(Continued)

FOREIGN PATENT DOCUMENTS

CN        1519628 A     8/2004
CN      101191935 A     6/2008
(Continued)

OTHER PUBLICATIONS

First Office Action, including Search Report, for Chinese Patent Application No. 201410505653.5, dated Jul. 21, 2016, 9 pages.
(Continued)

*Primary Examiner* — Edward Glick
*Assistant Examiner* — Anthony G Quash
(74) *Attorney, Agent, or Firm* — Westman, Champlin & Koehler, P.A.

(57) ABSTRACT

An array substrate, a method of manufacturing the array substrate, and a display device are disclosed, for eliminating white Mura defects generated during the Cell process. The method comprises steps of: forming a display area and a non-display area on a substrate, a circuit bonding area being
(Continued)

arranged within the non-display area; forming an alignment film within the display area through a patterning process; forming, through a patterning process, a transparent protection layer at least in a portion of the non-display area other than the circuit bonding area; and forming, through a rubbing-imprinting process, a plurality of lines having the same orientation on a surface of the alignment film, for an ordered arrangement of liquid crystal molecules, wherein a surface height of the transparent protection layer is lower than or equal to a surface height of the alignment film.

3 Claims, 7 Drawing Sheets

(51) Int. Cl.
    *G02F 1/1343* (2006.01)
    *G02F 1/1335* (2006.01)
    *G02F 1/1362* (2006.01)

(52) U.S. Cl.
    CPC .. *G02F 1/134309* (2013.01); *G02F 1/136286* (2013.01); *G02F 2001/133792* (2013.01); *G02F 2201/121* (2013.01); *G02F 2201/123* (2013.01); *G02F 2201/50* (2013.01)

(56) References Cited

U.S. PATENT DOCUMENTS

2003/0016328 A1    1/2003    Chung et al.
2009/0286340 A1\*  11/2009  Kaneko ............... G02F 1/13363
                                      438/30
2012/0069509 A1\*  3/2012  Ikeguchi ........... G02F 1/133351
                                    361/679.01
2012/0300163 A1    11/2012  Moriwaki et al.
2012/0327347 A1\*  12/2012  Cho ..................... G02F 1/1339
                                      349/138

FOREIGN PATENT DOCUMENTS

| CN | 101211068 A | * | 7/2008 | ........... G02F 1/1333 |
|----|-------------|---|--------|------------------------|
| CN | 102043295 A |   | 5/2011 |                        |
| CN | 102455548 A |   | 5/2012 |                        |
| CN | 102687066 A |   | 9/2012 |                        |
| CN | 104166273 A |   | 11/2014 |                       |
| CN | 104280958 A |   | 1/2015 |                        |
| JP | 2005-164733 A |  | 6/2005 |                        |
| JP | 2005-338529 A |  | 12/2005 |                       |

OTHER PUBLICATIONS

International Search Report and Written Opinion for PCT Application No. PCT/CN2015/079442, dated Jul. 15, 2015, 11 pages.

English translation of Box No. V of the Written Opinion for the International Searching Authority of PCT Application No. PCT/CN2015/079442, 2 pages.

\* cited by examiner

ARRAY SUBSTRATE AND METHOD OF MANUFACTURING THE SAME, AND DISPLAY DEVICE

CROSS-REFERENCE TO RELATED APPLICATIONS

This application is a Section 371 National Stage Application of International Application No. PCT/CN2015/079442, filed 21 May 2015, entitled "ARRAY SUBSTRATE AND METHOD OF MANUFACTURING THE SAME, AND DISPLAY DEVICE", which has not yet published, which claims priority to Chinese Application No. 201410505653.5, filed on 26 Sep. 2014, incorporated herein by reference in their entirety.

BACKGROUND OF THE INVENTION

Field of the Invention

The present disclosure relates to the field of display technologies, and particularly, to an array substrate and a method of manufacturing the array substrate, and a display device.

Description of the Related Art

Thin Film Transistor Liquid Crystal Display (TFT-LCD), as a flat panel display device, has features of small volume, low power consumption, radiationless, relatively low production cost and the like, and is increasingly applied in the field of high-performance display.

Figure 1:
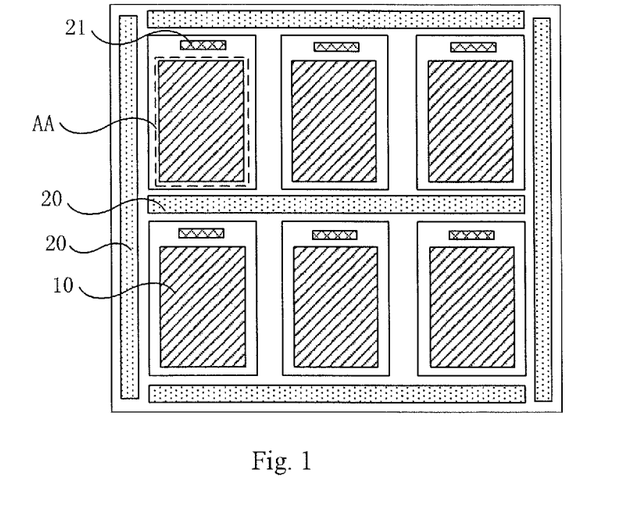
FIG. 1 is a partial plan view of an array substrate in prior arts.

A TFT-LCD comprises an array substrate and a color filter substrate. A liquid crystal layer is arranged between the array substrate and the color filter substrate, and deflection of liquid crystal molecules in the liquid crystal layer is controlled to achieve control of light intensity for the final propose of image display. Existing processes of manufacturing the TFT-LCD mainly include four stages: a color filter substrate manufacturing process, an Array process (array substrate manufacturing process), a Cell process (liquid crystal cell manufacturing process), and a Module process (module assembling process). In order to effectively control the deflection of the liquid crystal molecules, as shown in FIG. 1, in the Cell process, an alignment film 10 needs to be provided on a surface of an active display area (Active Area, and AA area for short) of array substrate that has been already manufactured, such that the liquid crystal molecules can be arranged consistently with each other on a surface of the alignment film 10. Specifically, a transparent resin layer is formed on the surface of the AA area, and then a surface of the transparent resin layer is rubbed by using a printing roller (Rubbing Cloth) so as to form regular lines, thereby finishing manufacturing of the alignment film 10.

During the process of manufacturing the alignment film, however, when a surface of a material layer of the alignment film is rubbed by the printing roller, an area outside of the AA area (non-display area) will also be rubbed. Since metal wires 20 for transmitting control signals or a metal layer for a circuit bonding area 21 are arranged within the non-display area, when the metal wires 20 or the metal layer is rubbed by the printing roller, metal scraps and excessive scraps of the rubbing cloth (Cloth) on the printing roller are generated. The metal scraps are relative hard and will damage the surface of the manufactured alignment film 10 under impacting of a water stream during cleaning, and the above cloth scraps will remain on the surface of the alignment film, such that some of the liquid crystal molecules cannot be arranged at preset positions. As a result, deflection states of the above liquid crystal molecules in a disordered arrangement state cannot be effectively controlled during display, which results in uncontrolled bright pixel points (i.e., the white Mura defect) in the AA area and adverse effects on image quality. Although in prior arts the array substrate will be optically detected and then the detected defects will be repaired, a pixel electrode layer on the array substrate has a relative thin thickness, which reduces defect recognizability in the optical detection. Thus, an omission factor of the white Mura defects increases, thereby significantly reducing product quality and display effect.

SUMMARY OF THE INVENTION

Embodiments of The present disclosure provide an array substrate and a method of manufacturing the same, and a display device, for eliminating phenomenon of white Mura defects generated during the Cell process.

According to one aspect of embodiments of the present disclosure, there is provided a method of manufacturing an array substrate, comprising steps of:

forming a display area and a non-display area on a substrate, a circuit bonding area being arranged within the non-display area;

forming an alignment film in the display area through a patterning process;

forming, through a patterning process, a transparent protection layer at least in a portion of the non-display area other than the circuit bonding area; and forming, through a rubbing-imprinting process, a plurality of lines having the same orientation on a surface of the alignment film, for an ordered arrangement of liquid crystal molecules, wherein a surface height of the transparent protection layer is lower than or equal to a surface height of the alignment film.

In the method of manufacturing the array substrate according to one embodiment of the present disclosure, the step of forming a transparent protection layer comprises:

coating a first resin layer on a surface of the substrate on which the alignment film has been formed;

forming photoresist on a surface of the first resin layer;

forming, through a single masking and exposing process and a single development process, a first full coverage area of the photoresist and a first full removal area of the photoresist, the first full coverage area of the photoresist corresponding to the transparent protection layer to be formed and the first full removal area of the photoresist corresponding to the circuit bonding area and a pattern of the alignment film;

etching a portion of the first resin layer corresponding to the first removal area of the photoresist; and peeling off the photoresist in the first full coverage area of the photoresist, so that a remaining portion of the first resin layer forms the transparent protection layer.

In the method of manufacturing the array substrate according to one embodiment of the present disclosure, the steps of forming the alignment film and the transparent protection layer comprise:

coating a first resin layer on a surface of the substrate having the display area and the non-display area;

coating a second resin layer on the first resin layer;

forming photoresist on a surface of the second resin layer;

forming, through a single masking and exposing process and a single development process, a second full coverage area of the photoresist, a second full removal area of the photoresist, and a partial removal area of the photoresist, the second full coverage area of the photoresist corresponding to the alignment film to be formed, the second full removal area of the photoresist corresponding to the circuit bonding area, and the partial removal area of the photoresist corresponding to the transparent protection layer to be formed;

etching a portion of the second resin layer and a portion of the first resin layer corresponding to the second full removal area of the photoresist;

ashing a portion of the photoresist in the partial removal area of the photoresist, and etching a portion of the second resin layer corresponding to the partial removal area of the photoresist; and peeling off a portion of the photoresist within the second full coverage area, so that a remaining portion of the first resin layer forms the transparent protection layer.

In the method of manufacturing the array substrate according to one embodiment of the present disclosure, the transparent protection layer has a thickness in a range from 2 μm to 5 μm.

In the method of manufacturing the array substrate according to one embodiment of the present disclosure, an area of the circuit bonding area is smaller than a printing area of a printing roller for implementing the rubbing-imprinting process.

According to another aspect of embodiments of the present disclosure, there is provided an array substrate, comprising:

a substrate provided with a display area and a non-display area, a circuit bonding area being arranged within the non-display area;

an alignment film in the display area, a plurality of lines having the same orientation being formed on a surface of the alignment film, for an ordered arrangement of liquid crystal molecules; and a transparent protection layer located at least in a portion of the non-display area other than the circuit bonding area;

wherein a surface height of the transparent protection layer is lower than or equal to a surface height of the alignment film.

In the array substrate according to one embodiment of the present disclosure, a portion of a surface of the substrate corresponding to the display area is provided only with the alignment film thereon.

In the array substrate according to one embodiment of the present disclosure, the transparent protection layer and the alignment film are disposed in sequence on a portion of a surface of the substrate corresponding to the display area.

In the array substrate according to one embodiment of the present disclosure, the transparent protection layer has a thickness in a range from 2 μm to 5 μm.

In the array substrate according to one embodiment of the present disclosure, an area of the circuit bonding area is smaller than a printing area of a printing roller for forming the lines by implementing a rubbing-imprinting process.

According to a further aspect of embodiments of the present disclosure, there is provided a display device, comprising the array substrate according to any one of the above embodiments.

Embodiments of The present disclosure provide an array substrate and a method of manufacturing the same, and a display device, for eliminating phenomenon of white Mura defects generated during the Cell process. According to the above method, during the rubbing-imprinting process on the alignment film, the presence of the protection layer can protect metal wires for transmitting control signals under the protection layer from being rubbed by the printing roller, thereby avoiding generation of metal scraps and excessive cloth scraps.

BRIEF DESCRIPTION OF THE DRAWINGS

Accompanying drawings, which are used when describing embodiments of the present invention or prior arts, will be briefly introduced in order to illustrate technical solutions in the embodiments of the present invention or in prior arts more clearly. Obviously, the accompanying drawings described in the following description are only to illustrate some embodiments of the present invention, and other drawings may be obtained according to these accompanying drawings without creative work.

REFERENCE NUMBERS

01—substrate; 10—alignment film; 20—metal wire; 21—circuit bonding area; 30—transparent protection layer; 40—photoresist; 101—first resin layer; 201—second resin layer; 401—first full coverage area of the photoresist; 402—first full removal area of the photoresist; 411—second full coverage area of the photoresist; 412—second full removal area of the photoresist; 413—partial removal area of the photoresist; AA—display area.

DETAILED DESCRIPTION OF THE EMBODIMENTS

Technique solution in embodiments of the present disclosure will be described clearly and thoroughly hereinafter in detail with reference to the accompanying drawings in the embodiments of the present disclosure. Obviously, the described embodiments are only some, rather than all, of embodiments of the present disclosure. Based on the embodiments of the present disclosure, all of other embodiments obtained by those skilled in the art without any creative work will fall within the scope of the present invention.

Further, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
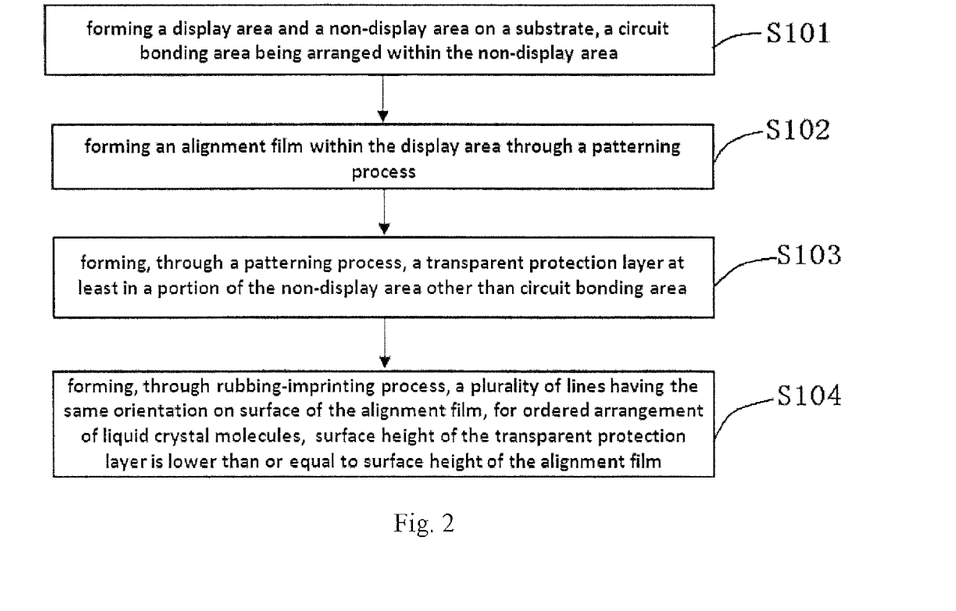
FIG. 2 is a flowchart of a method of manufacturing an array substrate according to one exemplary embodiment of the present disclosure.
Figure 3:
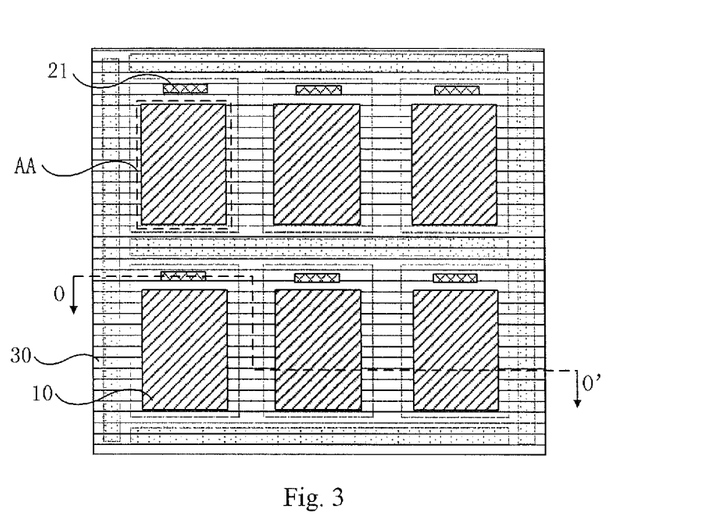
FIG. 3 is a partial plan view of an array substrate according to one exemplary embodiment of the present disclosure.
Figure 4:
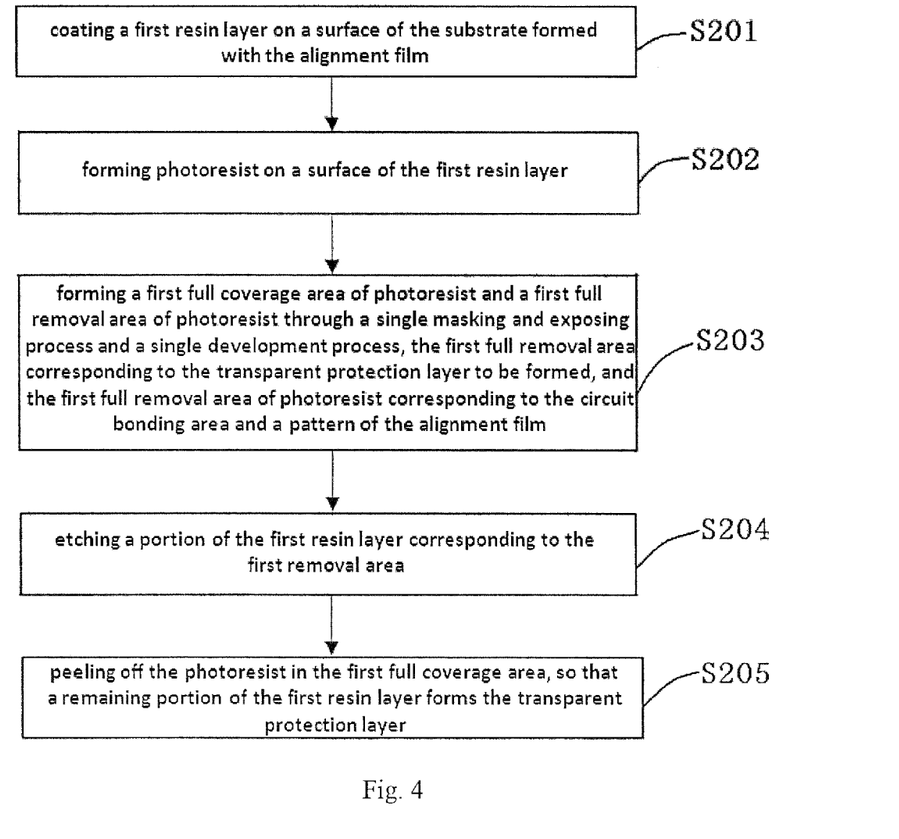
FIG. 4 is a flowchart of forming a transparent protection layer in a method of manufacturing an array substrate according to one exemplary embodiment of the present disclosure.

With reference to FIGS. 1-3, a method of manufacturing an array substrate according to one exemplary embodiment of the present disclosure comprises the following steps:

S101: forming a display area AA and a non-display area (an area except the display area AA, which is not indicated by reference number in figures) on a substrate 01, as shown in FIG. 1;

S102: forming an alignment film in the display area AA through a patterning process, as shown in FIG. 3;

S103: forming, through a patterning process, a transparent protection layer 30 at least in a portion of the non-display area other than a circuit bonding area 21; and S104: forming, through a rubbing-imprinting process, a plurality of lines having the same orientation on a surface of the alignment film 10, for an ordered arrangement of liquid crystal molecules in a liquid crystal layer, wherein a surface height of the transparent protection layer 30 is lower than or equal to a surface height of the alignment film 10.

With the method of manufacturing an array substrate according to the embodiment of the present disclosure, during the rubbing-imprinting process implemented on the alignment film, the presence of the protection layer can protect metal wires for transmitting control signals under the protection layer from being rubbed by the printing roller, thereby avoiding generation of metal scraps and excessive cloth scraps.

In addition, although a surface of the circuit bonding area is not covered by the transparent protection layer, an area of the above circuit bonding area is generally set to be smaller than a printing area of the printing roller for implementing the rubbing-imprinting process during manufacturing the array substrate, and the transparent protection layer is located higher than the circuit bonding area. Thus, during implementing the rubbing-imprinting process, the printing roller will contact the transparent protection layer at periphery of the circuit bonding area and will not wear the metal layer within the circuit bonding area, thereby avoiding generation of metal scraps. As a result, during subsequent cleaning process, no hard metal scrap will damage the surface of the manufactured alignment film, and cloth scraps are reduced, thereby reducing the number of residual cloth scraps on the surface of the alignment film. Thus, the liquid crystal molecules can be orderly arranged at preset positions on the surface of the alignment film, thereby solving the problem of generation of the white Mura defects in the Cell process.

It is noted that the above circuit bonding area 21 may be used to bond a drive integrated circuits (ICs), for example, a drive IC for driving gate lines or data lines, and a flexible printed circuit board (FPC). Since the circuit bonding area 21 is exposed from the transparent protection layer 30, the bonding of the control circuit(s) will not be adversely affected during the Module process (module assembling process) of the display device.

When the surface height of the transparent protection layer 30 is equal to the surface height of the alignment film 10, not only the problem of generation of the white Mura defects in the Cell process can be solved, but also height differences among respective film layers on the surface of the array substrate can be reduced, such that the surface of the array substrate is flat. Dust and foreign matters are prevented from being accumulated at positions where the above height differences exist during production or transportation, thereby improving product quality. Further, during manufacturing the lines on the surface of the alignment film 10, the cloth on the printing roller can be prevented from being contaminated by the above dust or foreign matters.

Figure 5A:
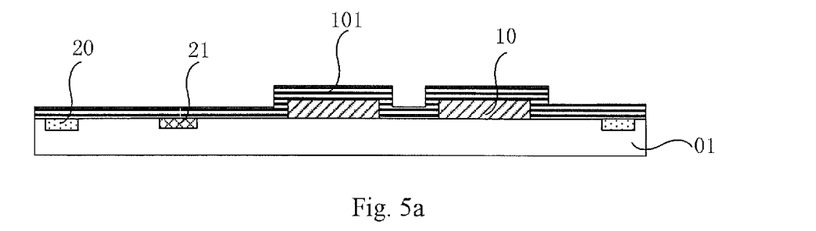
FIG. 5a to FIG. 5e are schematic diagrams showing manufacturing processes of forming the transparent protection layer in the method of manufacturing the array substrate according to the exemplary embodiment of the present disclosure.
Figure 5B:
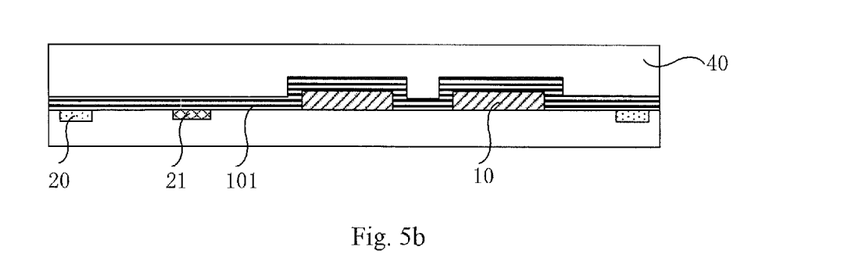
Figure 5C:
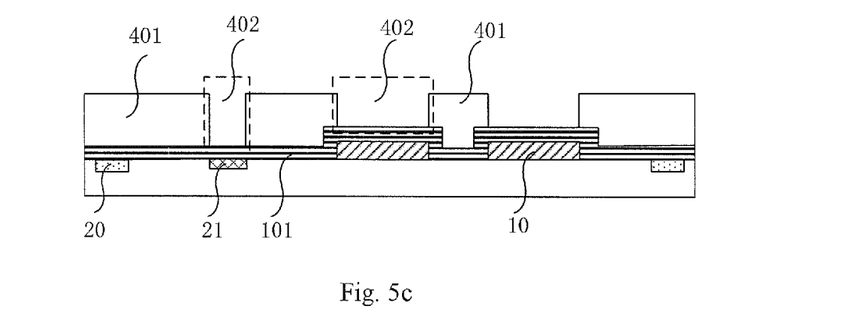
Figure 5D:
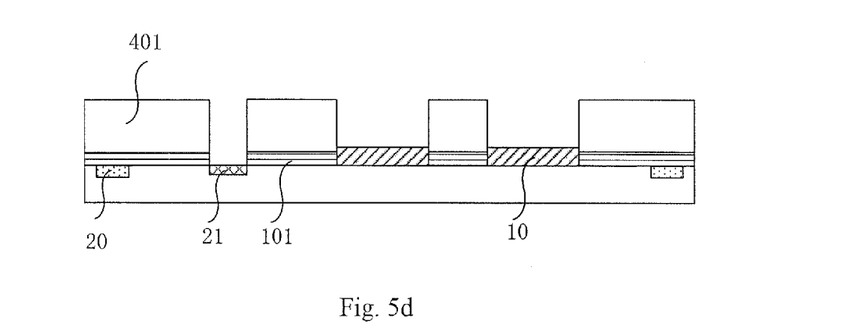
Figure 5E:
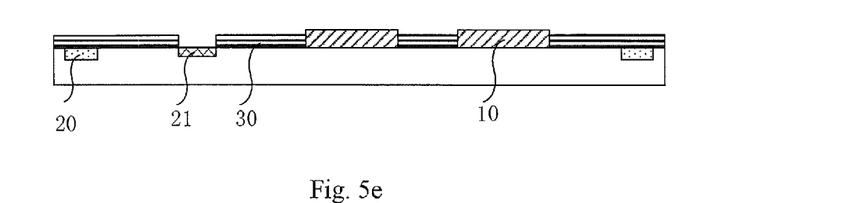

It is to be noted that, with reference to FIGS. 5a and 5e, the surface height may be a height from a surface of the thin film type transparent protection layer 30 away from the substrate 01 to the substrate 01. Thus, when mentioning that the surface height of the transparent protection layer 30 is lower than or equal to the surface height of the alignment film 10, it is intended that the height from the surface of the transparent protection layer 30 away from the substrate 01 to the substrate 01 is lower than or equal to a height from a surface of the alignment film 10 away from the substrate 01 to the substrate 01. In such a manner, it can be ensured that during the rubbing-imprinting process, the printing roller can make a sufficient contact with the surface of the alignment film 10.

In embodiments of the present disclosure, the patterning process may include a lithography process, or include a lithography process and an etching step, and meanwhile, may also include other processes for forming predetermined patterns, such as printing, ink-jetting or the like. The lithography process is a process including film formation, exposure, development and the like, and during which photoresist, masks, exposure machine and the like are used to form patterns. A suitable patterning process may be selected according to structures formed in the present disclosure. Hereinafter, a single patterning process according to embodiments of the present disclosure will be described with an example, in which different exposed regions are formed through a single masking and exposing process, then several removal processes, such as etching, ashing or the like, are applied to the different exposed regions, and finally expected patterns are obtained.

In the following, processes of forming the transparent protection layer 30 or/and the alignment film 10 before the step S104 will be described in detail.

In the exemplary embodiment shown in FIGS. 4 and 5a-5e, before the step S104, the method of forming the transparent protection layer 30 may include the following steps.

In S201, a first resin layer 101 is coated on a surface of the substrate 01 formed with the alignment film 10, as shown in FIG. 5a (which is a sectional view taken along line 0-0' in FIG. 3).

When manufacturing the array substrate, metal wires 20 and the circuit bonding area 21 have already been manufactured on the substrate 01, therefore the metal wires 20 and the circuit bonding area 21 are schematically shown in the substrate 01 in the figures of the embodiments of the present disclosure.

In S202, photoresist 40 is formed on a surface of the first resin layer 101, as shown in FIG. 5b.

In S203, a first full coverage area 401 of the photoresist and a first full removal area 402 of the photoresist are formed through a single masking and exposing process and a developing process. The first full coverage area 401 corresponds to a pattern of the transparent protection layer 30 to be formed, and the first full removal area 402 corresponds to the circuit bonding area 21 and a pattern of the alignment film 10, as shown in FIG. 5c.

In S204, a portion of the first resin layer 101 corresponding to the first removal area 402 is etched off, as shown in FIG. 5d.

In S205, a portion of the photoresist 40 in the first full coverage area 401 is peeled off, so that a remaining portion of the first resin layer 101 forms the transparent protection layer 30. The transparent protection layer 30 covers a portion of the non-display area except the circuit bonding area 21.

It is noted that, for the photoresist layer in embodiments of the present disclosure, if a positive photoresist is used, after exposing and developing through a mask, a portion of the photoresist layer within an exposed region may be removed during the developing, while a portion of the photoresist layer within an unexposed region is remained during the developing. If a negative photoresist is used, the portion of the photoresist layer within the exposed region is remained during the developing, while the portion of the photoresist layer within the unexposed region is removed during the developing. The type of the photoresist is not limited in the present disclosure. However, embodiments of the present disclosure are described with examples in which the portion of the photoresist layer within the exposed region is removed, while the portion of the photoresist layer within the unexposed region is remained.

As can be seen from FIG. 5e, the surface height of the transparent protection layer 30 is lower than or equal to the surface height of the alignment film 10 within the display area AA. Thus, before performing step S104, the printing roller can make a sufficient contact with the alignment film 10, and forms a pattern of lines having the same orientation on the surface of the alignment film 10. Since the metal wires 20 are covered by the transparent protection layer 30, the printing roller can be prevented from rubbing the metal wires 20 under the protection layer, thereby avoiding generation of metal scraps and excessive cloth scraps. In addition, during manufacturing the array substrate, although the surface of the circuit bonding area 21 is not covered by the transparent protection layer 30, an area of the circuit bonding area 21 is generally smaller than a printing area (i.e., a contact area between the printing roller and an object being printed) of the printing roller and the transparent protection layer 30 is located higher than the circuit bonding area 21. Thus, the printing roller will contact the transparent protection layer 30 at periphery of the circuit bonding area 21 and will not wear the metal layer within the circuit bonding area 21, thereby avoiding generation of metal scraps. As such, during subsequent cleaning process, no hard metal scrap will damage the surface of the manufactured alignment film, and cloth scraps are reduced, thereby reducing the number of residual cloth scraps on the surface of the alignment film. Thus, the liquid crystal molecules can be orderly arranged at preset positions on the surface of the alignment film, thereby solving the problem of generation of the white Mura defects in the Cell process.

In one embodiment, the above transparent protection layer 30 may has a thickness in a range from 2 μm to 5 μm. When the thickness of the transparent protection layer 30 is smaller than 2 μm, it is hard to form a film on the substrate due to the excessively thin thickness. When the thickness of the transparent protection layer 30 is larger than 5 μm, the thickness of the transparent protection layer 30 may be larger than the thickness of the alignment film 10, which results in that during the rubbing-imprinting process, the printing roller cannot contact the surface of the alignment film 10 and thereby cannot form the lines on the surface of the alignment film 10.

Figure 6:
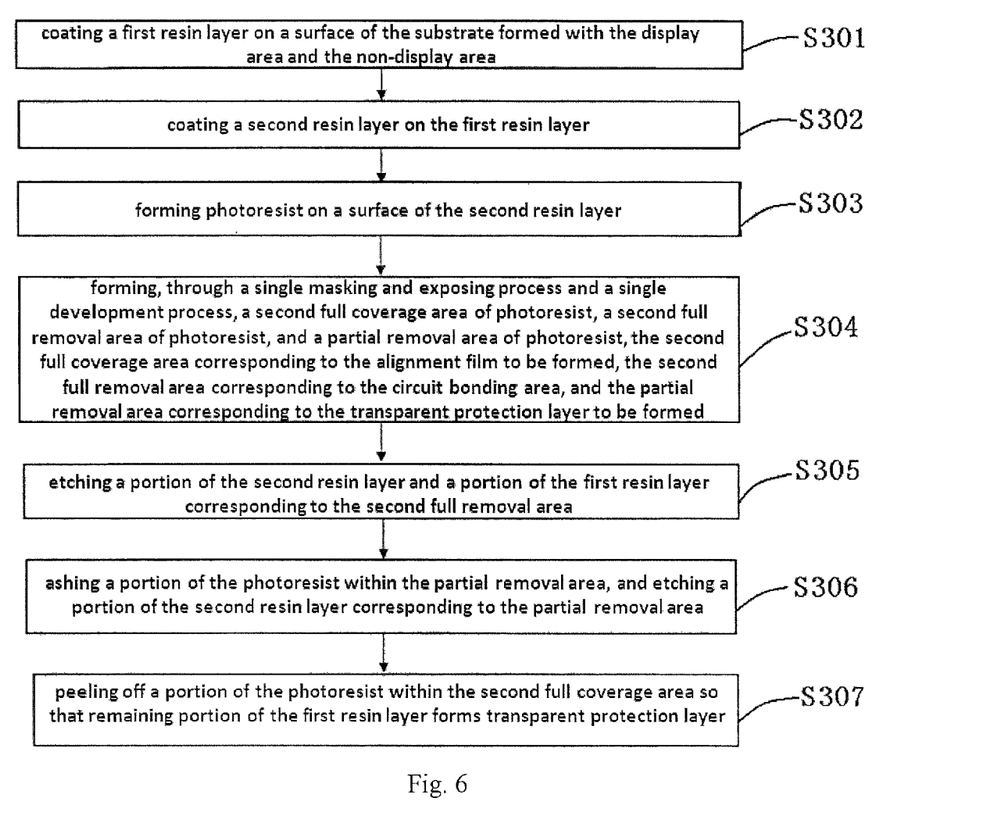
FIG. 6 is a flowchart of forming an alignment layer and a transparent protection layer in a method of manufacturing an array substrate according to another exemplary embodiment of the present disclosure.
Figure 7A:
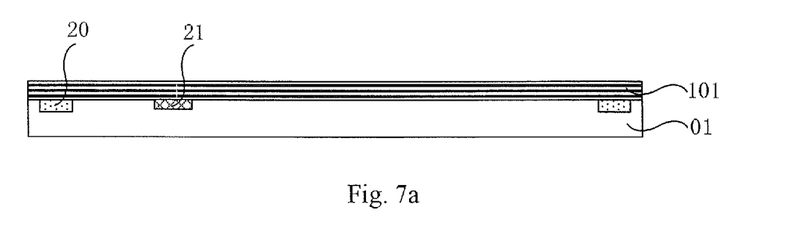
FIG. 7a to FIG. 7g are schematic diagrams showing manufacturing processes of forming the alignment layer and a transparent protection layer in the method of manufacturing the array substrate according to the another exemplary embodiment of the present disclosure.

In another exemplary embodiment shown in FIGS. 6 and 7a-5g (7g), before step S103, the method of forming the alignment film 10 and the transparent protection layer 30 may includes the following steps.

In S301, a first resin layer 101 is coated on a surface of the substrate 01 having the display area AA and the non-display area (not indicated by reference number in FIG. 3), as shown in FIG. 7a.

Figure 7B:
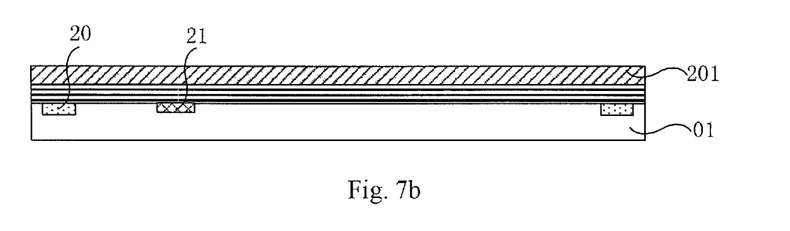

In S302, a second resin layer 201 is coated on the first resin layer 101, as shown in FIG. 7b.

Figure 7C:
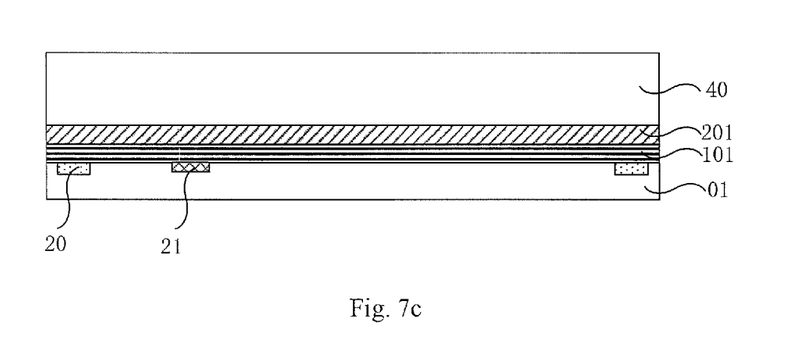

In S303, photoresist 40 is formed on a surface of the second resin layer 201, as shown in FIG. 7c.

Figure 7D:
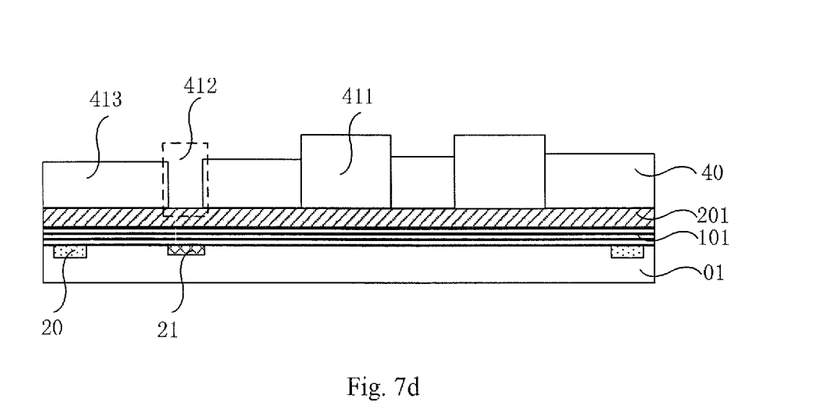

In S304, a second full coverage area 411 of the photoresist, a second full removal area 412 of the photoresist, and a partial removal area 413 of the photoresist are formed through a single masking and exposing process and a single developing process, as shown in FIG. 7d. The second full coverage area 411 corresponds to the alignment film 10 to be formed, the second full removal area 412 corresponds to the circuit bonding area 21, and the partial removal area 413 corresponds to the transparent protection layer 30 to be formed.

Figure 7E:
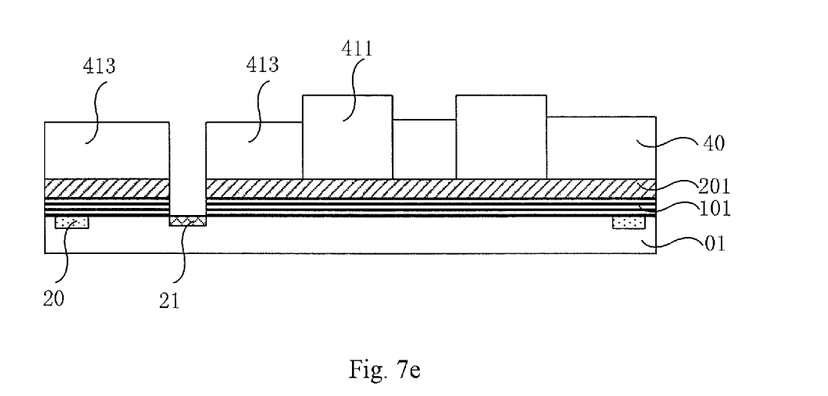

In S305, a portion of the second resin layer 201 and a portion of the first resin layer 101 corresponding to the second full removal area 412 are etched off, so that the circuit bonding area 21 is exposed, as shown in FIG. 7e.

Figure 7F:
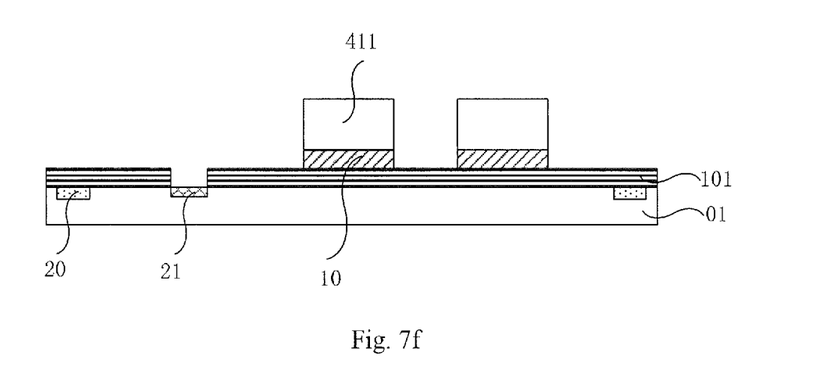

In S306, a portion of the photoresist 40 in the partial removal area 413 is ashed, and a portion of the second resin layer 201 corresponding to the partial removal area 413 is etched, so that a remaining portion of the second resin layer forms the alignment layer 10, as shown in FIG. 7f During such processes, a thickness of the photoresist within the second full coverage area 411 is thinned.

Figure 7G:
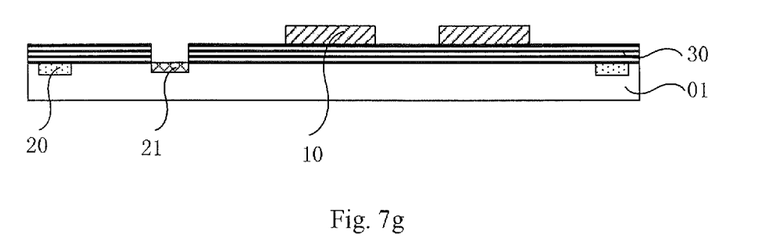

In S307, a portion of the photoresist 40 within the second full coverage area 411 is peeled off, so that a remaining portion of the first resin layer forms the transparent protection layer 30, as shown in FIG. 7g.

As can be seen from FIG. 7g, the alignment layer 10 is located on the surface of the transparent protection layer 30, so that not only lines can be formed on the surface of alignment layer 10, but also the metal wires 20 underneath the protection layer can be protected from being rubbed by the printing roller because the metal wire 20 is covered by the transparent protection layer 30, thereby avoiding generation of metal scraps and excessive cloth scraps. In addition, during manufacturing the array substrate, although the surface of the circuit bonding area 21 is not covered by the transparent protection layer 30, an area of the circuit bonding area 21 is generally smaller than a printing area (i.e., a contact area between the printing roller and an object being printed) of the printing roller and the transparent protection layer 30 is located higher than the circuit bonding area 21. Thus, the printing roller will contact the transparent protection layer 30 at periphery of the circuit bonding area 21 and will not wear the metal layer within the circuit bonding area 21, thereby avoiding generation of metal scraps. As such, during subsequent cleaning process, no hard metal scrap will damage the surface of the manufactured alignment film, and cloth scraps are reduced, thereby reducing the number of residual cloth scraps on the surface of the alignment film. Thus, the liquid crystal molecules can be orderly arranged at preset positions on the surface of the alignment film, thereby solving the problem of generation of the white Mura defects in the Cell process.

In the embodiment shown in FIG. 5e, there is no layer arrangement between the alignment layer 10 and the substrate 1, thus an electric field applied across two ends of the liquid crystal layer during display will not be affected. During manufacture, however, since the first resin layer 101 covering over the surface of the alignment layer 10 needs to be etched, a higher etching precision is required so that the surface of the alignment layer 10 is prevented from being damaged during etching.

In the embodiment shown in FIG. 7g, since the alignment layer 10 is located on the surface of the transparent protection layer 30, there is no need to etch the surface of the second resin layer that forms the alignment layer 10, thus, the surface of the alignment layer 10 is protected from being damaged due to undesired etching precision. In this embodiments, however, the transparent protection layer 30 is arranged between the alignment layer 10 and the substrate 01, thus, for a Twist Nematic (TN) type display device comprising a common electrode formed on the substrate, a distance between the common electrode and a pixel electrode on the color filter substrate is increased, therefore the electric field applied across two ends of the liquid crystal layer will be affected.

It can be understood that the above two arrangements may be selected by those skilled in the art according to practical requirements.

According to embodiments of another aspect of the present disclosure, as shown in FIG. 1, there is provided an array substrate, comprising: a substrate 01 provided with a display area AA and a non-display area (an area except the display area AA, which is not indicated by reference number in the attached drawings); an alignment film 10 in the display area AA, a plurality of lines having the same orientation being formed on a surface of the alignment film 10, for an ordered arrangement of liquid crystal molecules; and a transparent protection layer 30 located at least in a portion of the non-display area except a circuit bonding area 21. A surface height of the transparent protection layer 30 is lower than or equal to a surface height of the alignment film 10.

With the array substrate according to embodiments of the present disclosure, during the rubbing-imprinting process performed on the alignment film, the presence of the protection layer can prevent metal wires for transmitting control signals under the protection layer from being rubbed by the printing roller, thereby avoiding generation of metal scraps and excessive cloth scraps.

In one embodiment, an area of the circuit bonding area 21 is smaller than a printing area of the printing roller (not shown) for forming the lines by implementing the rubbing-imprinting process, and the printing area is a contact area between the printing roller and a printed object. As such, during manufacturing the array substrate, although the surface of the circuit bonding area 21 is not covered by the transparent protection layer 30, the area of the circuit bonding area 21 is generally smaller than the printing area of the printing roller and the transparent protection layer 30 is located higher than the circuit bonding area 21. Thus, the printing roller will contact the transparent protection layer 30 at periphery of the circuit bonding area 21 and will not wear the metal layer within the circuit bonding area 21, thereby avoiding generation of metal scraps. Therefore, during subsequent cleaning process, no hard metal scrap will damage the surface of the manufactured alignment film, and cloth scraps are reduced, thereby reducing the number of residual cloth scraps on the surface of the alignment film. Thus, the liquid crystal molecules can be orderly arranged at preset positions on the surface of the alignment film, thereby solving the problem of generation of the white Mura defects in the Cell process.

Hereinafter, a structure of the transparent protection layer 30 or the alignment film 10 will be described in detail.

As shown in FIG. 5e, in the array substrate, the portion of the surface of the substrate corresponding to the display area AA is provided only with the alignment film 10 thereon. Since the surface height of the transparent protection layer 30 is lower than or equal to the surface height of the alignment film 10 within the display area AA, the printing roller can contact the alignment film 10 before step S104 and form a pattern of lines having the same orientation on the surface of the alignment film 10. Since the metal wires 20 are covered by the transparent protection layer 30, the printing roller can be prevented from rubbing the metal wires 20 underneath the protection layer, thereby avoiding generation of metal scraps and excessive cloth scraps. In addition, during manufacturing the array substrate, although the surface of the circuit bonding area 21 is not covered by the transparent protection layer 30, an area of the circuit bonding area 21 is generally smaller than a printing area of the printing roller and the transparent protection layer 30 is located higher than the circuit bonding area 21. Thus, the printing roller will contact the transparent protection layer 30 at periphery of the circuit bonding area 21 and will not wear the metal layer within the circuit bonding area 21, thereby avoiding generation of metal scraps and excessive cloth scraps.

In one embodiment, the above transparent protection layer 30 may has a thickness in a range from 2 µm to 5 µm. When the thickness of the transparent protection layer 30 is smaller than 2 µm, it is hard to form a film on the substrate due to the excessively thin thickness. When the thickness of the transparent protection layer 30 is larger than 5 µm, the thickness of the transparent protection layer 30 may be larger than the thickness of the alignment film 10, which results in that during the rubbing-imprinting process, the printing roller cannot contact the surface of the alignment film 10 and thereby cannot form the lines on the surface of the alignment film 10.

As shown in FIG. 7g, in the array substrate, the transparent protection layer 30 and the alignment film 10 are disposed in sequence on a portion of the surface of the substrate corresponding to the display area AA. The alignment layer 10 is located on the surface of the transparent protection layer 30. As such, not only the lines can be formed on the surface of alignment layer 10, but also the metal wires 20 underneath the protection layer can be protected from being rubbed by the printing roller because the metal wire 20 is covered by the transparent protection layer 30, thereby avoiding generation of metal scraps and excessive cloth scraps. In addition, during manufacturing the array substrate, although the surface of the circuit bonding area 21 is not covered by the transparent protection layer 30, the area of the circuit bonding area 21 is generally smaller than the printing area of the printing roller and the transparent protection layer 30 is located higher than the circuit bonding area 21. Thus, the printing roller will contact the transparent protection layer 30 at periphery of the circuit bonding area 21 and will not wear the metal layer within the circuit bonding area 21, thereby avoiding generation of metal scraps.

In the embodiment shown in FIG. 5e, there is no layer arrangement between the alignment layer 10 and the substrate 1, thus an electric field applied across two ends of the liquid crystal layer during display will not be affected. During manufacture, however, since the first resin layer 101 covering over the surface of the alignment layer 10 needs to be etched, a higher etching precision is required so that the surface of the alignment layer 10 is prevented from being damaged during etching.

In the embodiment shown in FIG. 7g, since the alignment layer 10 is located on the surface of the transparent protection layer 30, there is no need to etch the surface of the second resin layer that forms the alignment layer 10, thus, the surface of the alignment layer 10 is protected from being damaged due to undesired etching precision. In this embodiments, however, the transparent protection layer 30 is arranged between the alignment layer 10 and the substrate 01, thus, for a Twist Nematic (TN) type display device comprising a common electrode formed on the substrate, a distance between the common electrode and a pixel electrode on the color filter substrate is increased, therefore the electric field applied across two ends of the liquid crystal layer will be affected.

It can be understood that the above two arrangements may be selected by those skilled in the art according to practical requirements.

In embodiments according to a further aspect of the present disclosure, there is provided a display device, comprising any one of the array substrates as described above, and having the same advantageous effects as the array substrate in the foregoing embodiments. Arrangement and advantageous effects of the array substrate have been described in detail in the foregoing embodiments, and thus will not be repeated herein.

In embodiments of the present disclosure, specifically, the display device may at least include a liquid crystal display device and an organic light emitting diode display device. For example, the display device may be a liquid crystal display, a liquid crystal TV, a digital frame, a mobile phone, a tablet computer or any other products or components having a display function.

The above description is only intended to illustrate preferred embodiments of the present disclosure, and the scope of the present invention is not limited thereto. Changes or alternatives that can be easily envisaged by those skilled in the art based on the disclosure of the present invention should fall within the scope of the present invention. Thus, the scope of the invention should be determined by the scopes of the claims.

What is claimed is:

1. A method of manufacturing an array substrate, comprising steps of:
    forming a display area and a non-display area on a substrate, a circuit bonding area being arranged within the non-display area;
    forming an alignment film in the display area through a patterning process;
    forming, through a patterning process, a transparent protection layer at least in a portion of the non-display area other than the circuit bonding area; and
    forming, through a rubbing-imprinting process, a plurality of lines having the same orientation on a surface of the alignment film, for an ordered arrangement of liquid crystal molecules,
    wherein a surface height of the transparent protection layer is lower than or equal to a surface height of the alignment film; and
    wherein the step of forming the transparent protection layer comprises:
        coating a first resin layer on a surface of the substrate on which the alignment film has been formed, such that the alignment film is located between the substrate and the first resin layer;
        forming a photoresist layer on a surface of the first resin layer;
        forming, through a single masking and exposing process and a single development process, a first full coverage area of the photoresist layer and a first full removal area of the photoresist layer, the first full coverage area of the photoresist layer corresponding to the transparent protection layer to be formed and the first full removal area of the photoresist layer corresponding to the circuit bonding area and a pattern of the alignment film;
        etching a portion of the first resin layer corresponding to the first removal area of the photoresist layer; and
        peeling off the photoresist in the first full coverage area of the photoresist layer, so that a remaining portion of the first resin layer forms the transparent protection layer.

2. The method according to claim 1, wherein the transparent protection layer has a thickness in a range from 2 μm to 5 μm.

3. A method of manufacturing an array substrate, comprising steps of:
    forming a display area and a non-display area on a substrate, a circuit bonding area being arranged within the non-display area;
    forming an alignment film in the display area through a patterning process;
    forming, through a patterning process, a transparent protection layer at least in a portion of the non-display area other than the circuit bonding area; and
    forming, through a rubbing-imprinting process, a plurality of lines having the same orientation on a surface of the alignment film, for an ordered arrangement of liquid crystal molecules,
    wherein a surface height of the transparent protection layer is lower than or equal to a surface height of the alignment film; and
    wherein the steps of forming the alignment film and the transparent protection layer comprise:
        coating a first resin layer on a surface of the substrate having the display area and the non-display area;
        coating a second resin layer on the first resin layer;
        forming a photoresist layer on a surface of the second resin layer;
        forming, through a single masking and exposing process and a single development process, a second full coverage area of the photoresist layer, a second full removal area of the photoresist layer, and a partial removal area of the photoresist layer, the second full coverage area of the photoresist layer corresponding to the alignment film to be formed, the second full removal area of the photoresist layer corresponding to the circuit bonding area, and the partial removal area of the photoresist layer corresponding to the transparent protection layer to be formed;
        etching a portion of the second resin layer and a portion of the first resin layer corresponding to the second full removal area of the photoresist layer;
        ashing a portion of the photoresist in the partial removal area of the photoresist layer, and etching a portion of the second resin layer corresponding to the partial removal area of the photoresist layer; and
        peeling off a portion of the photoresist within the second full coverage area of the photoresist layer, so that a remaining portion of the first resin layer forms the transparent protection layer.

* * * * *